(12) United States Patent
Ohnishi

(10) Patent No.: US 8,902,487 B2
(45) Date of Patent: Dec. 2, 2014

(54) PHOTOCHROMIC LENS

(75) Inventor: Tomofumi Ohnishi, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 14/008,304

(22) PCT Filed: Mar. 30, 2012

(86) PCT No.: PCT/JP2012/058539
§ 371 (c)(1),
(2), (4) Date: Oct. 24, 2013

(87) PCT Pub. No.: WO2012/133749
PCT Pub. Date: Oct. 4, 2012

(65) Prior Publication Data
US 2014/0036334 A1 Feb. 6, 2014

(30) Foreign Application Priority Data

Mar. 30, 2011 (JP) ................................. 2011-076614

(51) Int. Cl.
| G02F 1/00 | (2006.01) |
| G08K 5/3492 | (2006.01) |
| G03C 1/73 | (2006.01) |
| G02B 1/04 | (2006.01) |
| G02C 7/10 | (2006.01) |
| G02B 5/23 | (2006.01) |

(52) U.S. Cl.
CPC ............ G02B 1/041 (2013.01); C08K 5/34926 (2013.01); G03C 1/73 (2013.01); G02C 7/102 (2013.01); G02B 5/23 (2013.01); G03C 1/733 (2013.01)
USPC ...................................................... 359/241

(58) Field of Classification Search
CPC ...... C08K 5/34926; G03C 1/73; G03C 1/733; G02B 5/23; G02B 1/041
USPC ................. 359/241; 65/30.11; 252/582, 586; 264/1.32
See application file for complete search history.

(56) References Cited

U.S. PATENT DOCUMENTS

| 4,480,084 | A | 10/1984 | Kordomenos |
| 5,208,132 | A * | 5/1993 | Kamada et al. ............... 430/138 |
| 7,763,693 | B2 | 7/2010 | Nagoh et al. |
| 7,999,989 | B2 | 8/2011 | Asai et al. |
| 2004/0191520 | A1 | 9/2004 | Kumar et al. |
| 2006/0264593 | A1 | 11/2006 | Nagoh et al. |
| 2009/0316246 | A1 | 12/2009 | Asai et al. |

FOREIGN PATENT DOCUMENTS

| CN | 101512395 A | 8/2009 |
| JP | 61500172 A | 1/1986 |
| JP | 07-005323 | 10/1995 |
| JP | 2001-520699 A | 10/2001 |
| JP | 2008-033223 A | 2/2008 |
| WO | 2005014717 A1 | 2/2005 |
| WO | 2008/001578 A1 | 1/2008 |

OTHER PUBLICATIONS

International Preliminary Report on Patentability dated Oct. 17, 2013; and International Search Report dated Jun. 26, 2012 issued in corresponding PCT/JP/2012/058539.
Communication dated Aug. 1, 2014, issued by the State Intellectual Property Office of P.R. China in counterpart Chinese application No. 201280015452.6.
Communication dated Aug. 5, 2014, issued by the European Patent Office in counterpart European application No. 12763437.6.

* cited by examiner

*Primary Examiner* — Tuyen Tra
(74) *Attorney, Agent, or Firm* — Sughrue Mion, PLLC

(57) ABSTRACT

The present invention relates to a photochromic lens, which comprises a photochromic layer comprising a photochromic dye and a resin component, and an organic hardcoat layer in this order, wherein the resin component is an acrylic resin, and the photochromic layer further comprises a piperidine ring-containing compound having a molecular weight of equal to or greater than 1,000.

8 Claims, No Drawings

PHOTOCHROMIC LENS

CROSS REFERENCE TO RELATED APPLICATIONS

This application is a National Stage of International Application No. PCT/JP2012/058539, filed on Mar. 30, 2012, which claims priority from Japanese Patent Application No. 2011-076614, filed on Mar. 30, 2011, the contents of all of which are incorporated herein by reference in their entirety.

TECHNICAL FIELD

The present invention relates to a photochromic lens, and more particularly, to a photochromic lens affording good optical characteristics.

BACKGROUND ART

In recent years, photochromic lenses utilizing organic photochromic dyes have been sold as eyeglasses (for example, see WO2005/014717A1 or English language family members US2006/264593A1 and U.S. Pat. No. 7,763,693, which are expressly incorporated herein by reference in their entirety). They develop color in the bright outdoors, having the similar antiglare effect as high-concentration color lenses, and revert to high transmittance when moved indoors.

Photochromic lenses are required to quickly respond and develop highly concentrated color when prescribed light enters, and to rapidly lose the color when placed in an environment where such light is absent. Conventionally, the response rate of the color development/loss and the concentration of the color of a photochromic lens are thought to depend on intrinsic characteristics of the photochromic dye resulting from its molecular structure. Thus, the use of photochromic dyes having specific molecular structures has been studied to improve the response properties (response rate and color concentration) of photochromic films to light.

By contrast, it has been reported in recent years that the photochromic dyes in a photochromic film tend to function more readily and the color development/loss response rate and coloration concentration thereof are greatly enhanced by imparting suitable flexibility (fluidity) to the film (see WO2008/001578A1 or English language family members US2009/316246A1 and U.S. Pat. No. 7,999,989, which are expressly incorporated herein by reference in their entirety).

In a photochromic lens, a hardcoat layer is normally provided over the photochromic layer to ensure the durability of the lens. Providing such a hardcoat layer is particularly effective for increasing the durability of the lens when a suitable degree of flexibility is being imparted to a photochromic film, as described in WO2008/001578A1. Hardcoat layers formed from organic hardcoat liquids (organic hardcoat layers) can be readily formed with high hardness, and thus are widely employed in such applications.

However, the results of extensive research conducted by the present inventor have revealed that in a photochromic lens in which an organic hardcoat layer has been formed on a photochromic layer, the lens sometimes clouds, compromising optical characteristics.

SUMMARY OF THE INVENTION

An aspect of the present invention provides for a photochromic lens affording good optical characteristics in which lens clouding is inhibited.

The present inventor studied why clouding occurs in photochromic lenses. As a result, he discovered that minute irregularities present on the outer surface of the hardcoat layer cause diffuse reflection, resulting in clouding. In this regard, the present inventor presumed that since the photochromic layer and hardcoat layer were both comprised mainly of organic compounds, mixing would tend to occur between the layers. In particular, they presumed that compounds of low solubility in the matrix of the photochromic layer would leach out of (migrate from) the photochromic layer to the hardcoat layer, either impeding formation of the hardcoat layer or ultimately becoming precipitates on the outer surface of the hardcoat layer and causing clouding. Accordingly, the present inventor conducted further extensive research into components that tend to leach out of photochromic layers. This resulted in the discovery that piperidine ring-containing compounds, such as hindered amines that are widely employed as additives in the photochromic layer, that have low molecular weights seep out of acrylic-based photochromic layers in pronounced fashion. This happens because piperidine rings have poor compatibility with acrylic resins. When they are of high molecular weight, they do not dissolve into the matrix, but can still be retained within the layer. However, components of low molecular weight that tend to move above cannot be retained within the layer and are thought to leach out (migrate) into the hardcoat layer.

Based on the above knowledge, the present inventor discovered that the above-stated object was achieved by specifying that the molecular weight of the piperidine ring-containing compounds employed as additives in an acrylic photochromic layer be equal to or greater than 1,000. The present invention was devised on that basis.

An aspect of the present invention relates to:

a photochromic lens, which comprises:

a photochromic layer comprising a photochromic dye and a resin component, and an organic hardcoat layer in this order, wherein the resin component is an acrylic resin, and the photochromic layer further comprises a piperidine ring-containing compound having a molecular weight of equal to or greater than 1,000.

The piperidine ring-containing compound can be a hindered amine.

The molecular weight of the piperidine ring-containing compound can be equal to or lower than 4,000.

The organic hardcoat layer can comprise an organic silicon compound and metal oxide particles.

The present invention can provide a photochromic lens affording good optical characteristics.

DETAILED DESCRIPTION OF FORMS

The present invention relates to a photochromic lens comprising a photochromic layer that contains a photochromic dye and a resin component, and an organic hardcoat layer. In the photochromic lens of the present invention, the resin component (matrix) that is contained in the photochromic layer is an acrylic resin. The photochromic layer further comprises a piperidine ring-containing compound having a molecular weight of equal to or greater than 1,000. A piperidine ring-containing compound of low molecular weight being lower than 1,000 tends to seep out of the acrylic photochromic layer and leach (migrate) into the above organic hardcoat layer. When such leaching occurs, clouding results and the optical characteristics of the photochromic lens that is obtained end up deteriorating. By contrast, in the present invention, a piperidine ring-containing compound of a high molecular weight of equal to or greater than 1,000 is employed in the acrylic photochromic layer. Thus, it is possible to inhibit the generation of clouding and retain the piperidine ring-containing compound within the photochromic layer, thereby enhancing the effect achieved by its addition.

The photochromic lens of the present invention is described in greater detail below.

Lens Substrate

A method such as the method (coating method) of providing a resin coating containing a photochromic dye on a lens substrate, the method (impregnation method) of impregnating a photochromic dye into the lens substrate, the method (kneading method) of kneading one in, or the like is employed as the method of manufacturing the photochromic lens. In the photochromic lens of the present invention, the resin component in the photochromic layer is a resin (acrylic resin) formed by the polymerization reaction of an acrylic monomer. In a photochromic lens formed by the above impregnation method or kneading method, the lens substrate itself that contains a photochromic dye becomes the photochromic layer. Accordingly, in that case, the lens substrate is comprised of an acrylic resin. Additionally, in the coating method, the lens substrate is not specifically limited. A common lens substrate of plastic, inorganic glass or the like, can be employed. In the impregnation method or kneading method, it is better to select a suitable substrate material from among acrylic resins in order to achieve good photochromic characteristics. However, the coating method is desirable because it does not impose such a restriction on the substrate. Examples of the above plastic are methyl methacrylate homopolymers, copolymers of methyl methacrylate and one or more other monomers, diethylene glycol bisallylcarbonate homopolymers, copolymers of diethylene glycol bisallylcarbonate and one or more other monomers, sulfur-containing copolymers, halogen copolymers, polycarbonates, polystyrenes, polyvinyl chloride, unsaturated polyester, polyethylene terephthalate, polyurethane, polythiourethane, polymers of materials in the form of epithio group-containing compounds, homopolymers of monomers having sulfide bonds, copolymers of a sulfide and one or more other monomers, copolymers of a polysulfide and one or more other monomers, and copolymers of a polydisulfide and one or more other monomers. The thickness of the substrate is not specifically limited, and is normally about 1 to 30 mm. The shape of the layer of the substrate on which the photochromic layer is formed is not specifically limited, and can be of any shape, such as flat, convex, or concave.

In the coating method, the photochromic layer is normally provided on the lens substrate, either directly or indirectly over another layer. Examples of layers that can be formed between the photochromic layer and the substrate are a hardcoat layer and a primer layer. The hardcoat layer that is formed here can be an inorganic vapor deposition layer or the organic hardcoat layer that is described further below. It is also possible to provide a hardcoat layer formed from the composition described in Japanese Translated PCT Patent Application Publication (TOKUHYO) No. 2001-520699, which is expressly incorporated herein by reference in its entirety, to impart abrasion-resistance to the substrate. A known resin such as polyurethane that is capable of functioning as an adhesive layer can be employed as a primer layer formed between the substrate and the photochromic layer. The aqueous resin layer described further blow is an example of a desirable primer layer.

The thickness of the hardcoat layer and primer layer formed here can be about 0.5 to 10 μm in thickness. Some lens substrates with hardcoats are commercially available. The photochromic lens of the present invention can have a photochromic layer on such a lens substrate.

Photochromic Layer

In the photochromic lens of the present invention, the resin component of the photochromic layer is a resin (acrylic resin) that is formed by the curing reaction (polymerization) of an acrylic curable component. In a photochromic lens formed by the above impregnation method or kneading method, the lens substrate itself containing a photochromic dye becomes the photochromic layer. Additionally, in the coating method, a photochromic layer that contains a photochromic dye in a cured product (resin component) can be formed by directly or Indirectly coating a photochromic liquid containing a photochromic dye and a curable component on a substrate and then conducting a curing treatment. More particularly, the photochromic liquid can be formed of an acrylic curable component, a photochromic dye, a polymerization initiator, and various additives.

Further, the photochromic lens of the present invention comprises a piperidine ring-containing compound having a molecular weight of equal to or greater than 1,000 as an additive. A piperidine ring-containing compound with a molecular weight of less than 1,000 will have poor solubility in the acrylic resin and thus not remain in the layer. As a result, it will seep out of the photochromic layer, leach (migrate) into the upper organic hardcoat layer, and cause clouding. By contrast, a piperidine ring-containing compound with a molecular weight of equal to or greater than 1,000 will tend not to migrate due to its high molecular weight, even if it does not dissolve fully into the acrylic resin. Accordingly, the use of a piperidine ring-containing compound with a molecular weight of equal to or greater than 1,000 can prevent the piperizine ring-containing compound from migrating between layers from the photochromic layer and causing clouding in the organic hardcoat layer above it. The greater the molecular weight, the stronger the tendency for the piperidine ring-containing compound not to migrate between layers, which is desirable. However, the viscosity of the photochromic layer-forming coating liquid increases and suitability for coating tends to drop. From the perspective of suitability for coating, the molecular weight of the piperidine ring-containing compound that is added to the photochromic layer is desirably equal to or lower than 4,000. When the piperidine ring-containing compound is a polymer, the molecular weight refers to the mass average molecular weight, or the molecular weight distribution falls within the above-stated range. The average molecular weights given below are mass average molecular weights.

Just one of the above piperidine ring-containing compounds, or a combination of two or more, can be employed. A hindered amine is desirably employed as the piperidine ring-containing compound of the above-stated molecular weight to obtain a photochromic lens that will maintain good optical characteristics that will not deteriorate over extended periods. The reason for this is as follows.

High-molecular-weight materials are known to present the problem of oxidation deterioration triggered by energy such as ultraviolet radiation and heat by the following mechanism in the presence of oxygen. First, when a high-molecular-weight compound is exposed to high energy such as irradiation with UV light, radicals are generated in the polymer. When that happens, they become starting points for the generation of new radicals or peroxides. Since most peroxides are unstable, they readily break down in the presence of heat or light, creating new radicals. In this manner, once oxidation has begun, it continues in chain-like fashion, breaking down high-molecular-weight materials and compromising their functions. To prevent the oxidation that occurs by means of this mechanism, it is conceivable to employ (1) the method of disabling the radicals that are produced, and (2) the method of breaking down the peroxides that are produced into harmless substances and preventing them from generating new radicals. It is conceivable to employ a compound with radical-scavaging capability (radical scavenger) to prevent oxidation in method (1). It is conceivable to employed a compound with peroxide-decomposing capability (peroxide-decomposing agent) to prevent oxidation in method (2). A photochromic compound will absorb UV light from sunlight, undergo a change in molecular structure, and develop color. It is returned to its original state by absorbing heat or visible light. When oxygen is present along these paths of change, energy is shifted to the oxygen, generating oxygen radicals with strong oxidizing power. Accordingly, scavenging the oxygen radicals with compounds having radical-scavenging capability can effectively prevent oxidation in a photochromic film. Accordingly, it is desirable to employ an additive in the photochromic layer in the form of a compound having radical-scavenging capability in the present invention. From this perspective, the use of a hindered amine—a compound with radical-scavenging capability—as the above piperidine ring-containing compound of high molecular weight.

The hindered amine comprises the following structure within the molecule:

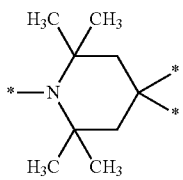

in which there are bonds with atoms such as hydrogen atoms or other structures at the positions indicated by "*". The piperidine ring-containing compound that is employed in the present invention has a molecular weight of equal to or greater than 1,000. Thus, a hindered amine in the form of a polymer having the above structure in the principal chain and/or a side chain is normally employed. For similar reasons, piperidine ring-containing compounds other than hindered amines in the form of polymers containing a piperidine ring in the principal chain and/or a side chain are normally employed. The piperidine ring that is contained can have substitutions in the form of substituents such as alkyl groups, such as shown in the above structure. Each of these can be synthesized by known methods and is available commercially. The quantity added, for example, ranges from 0.001 to 20 mass parts per 100 mass parts of acrylic resin. From the perspective of effectively preventing oxidation in the photochromic layer (photodecomposition), a range of 0.1 to 10 mass parts is desirable and a range of 1 to 5 mass parts is preferred.

The various components constituting the photochromic layer will be described in greater detail below.

(i) Curable Compound

The curable compound employed to form the photochromic layer in the present invention is an acrylic compound. From the perspective of availability and curability, a compound having a radical-polymerizable group in the form of a (meth)acryloyl group or (meth)acryloyloxy group is desirable. The above (meth)acryloyl indicates both acryloyl and methacryloyl, and the above (meth)acryloyloxy indicates both acryloyloxy and methacryloyloxy. For details, reference can be made to paragraphs [0050] to [0075] of WO2008/001578A1.

(ii) Photochromic Dye

Examples of the photochromic dye that is contained in the photochromic layer are known photochromic dyes such as fulgimide compounds, spirooxazine compounds, and chromene compounds. These photochromic compounds can be employed in the present invention without specific limitation. For specific details, reference can be made to paragraphs [0076] to [0088] of WO2008/001578A1. The concentration of the photochromic dye in the photochromic layer is desirably 0.01 to 20 mass parts, preferably 0.1 to 10 mass parts, per 100 mass parts of acrylic resin.

(iii) Polymerization Initiator

The polymerization initiator that is added to the photochromic liquid used to form a photochromic layer by the coating method can be suitably selected from among known thermal polymerization initiators and photopolymerization initiators, based on the polymerization method. For details, reference can be made to paragraphs [0089] and [0090] of WO2008/001578A1.

(iv) Additives

Additives such as surfactants, oxidation-inhibiting agents, radical scavengers, UV radiation stabilizers, UV radiation-absorbing agents, release agents, discoloration-preventing agents, antistatic agents, fluorescent dyes, dyes, pigments, fragrance materials, and plasticizers can be added to the above photochromic liquid to enhance the durability, color development rate, color loss rate of the photochromic dye, and moldability or the like. Known compounds can be employed without restriction as these additives. For details, reference can be made to paragraphs [0092] to [0097] of WO2008/001578A1. The hindered amines described in paragraph [0095] of WO2008/001578A1 are components that are desirably employed in the present invention as set forth above.

In the coating method, a photochromic liquid containing the components set forth above can be coated and cured to form a photochromic layer. The method of preparing the photochromic liquid is not specifically limited in the present invention; it can be prepared by weighing out and mixing the various components in prescribed quantities. Nor is the order of addition of the various components specifically limited. All of the components can be simultaneously added, or the monomer components alone can be premixed and the photochromic dye and other additives can be admixed just prior to polymerization. The photochromic liquid desirably has a viscosity at 25° C. of 20 to 500 mPa·s, preferably 50 to 300 mPa·s, and more preferably, 60 to 200 mPa·s. Staying within the above viscosity range can facilitate coating of the photochromic liquid and obtaining a photochromic film of desired thickness. The photochromic liquid can be coated by a known coating method such as spin-coating.

After coating the above photochromic liquid on the substrate, a curing treatment (heating, irradiation with light, or the like) is conducted based on the type of curable component that is contained in the photochromic liquid to form a photochromic layer. The curing treatment can be conducted by a known method. From the perspective of achieving good photochromic characteristics, the thickness of the photochromic layer is desirably equal to or greater than 10 μm, preferably 20 to 60 μm.

Organic Hardcoat Layer

Various organic layers generally used as hardcoat layers can be applied as the hardcoat layer provided on the photochromic layer. From the perspective of achieving both enhanced lens durability and optical characteristics, the thickness desirably falls within a range of 0.5 to 10 μm.

From the perspective of enhancing the durability of the lens, the hardcoat layer desirably contains an organic silicon compound and metal oxide particles. A hardcoat layer containing an organic silicon compound is also desirable from the perspectives of adhesion to the above-described intermediate layer comprised of a silicon oxide and the refractive index close to that of the intermediate layer. The hardcoat composition described in Japanese Unexamined Patent Publication (KOKAI) Showa No. 63-10640, which is expressly incorporated herein by reference in its entirety, is an example of a hardcoat composition that can be used to form such a hardcoat layer.

The organic silicon compound denoted by general formula (I) below and hydrolysis products thereof are examples of desirable embodiments of the organic silicon compound.

$$(R^1)_a(R^3)_b Si(OR^2)_{4-(a+b)} \tag{I}$$

In general formula (I), $R^1$ denotes an organic group comprising a glycidoxy group, epoxy group, vinyl group, methacryloxy group, acryloxy group, mercapto group, amino group, or phenyl group, or the like. $R^2$ denotes an alkyl group with 1 to 4 carbon atoms, an acyl group with 1 to 4 carbon atoms, or an aryl group with 6 to 10 carbon atoms. $R^3$ denotes an alkyl group with 1 to 6 carbon atoms or an aryl group with 6 to 10 carbon atoms. Each of a and b denotes 0 or 1.

The alkyl group with 1 to 4 carbon atoms denoted by $R^2$ is a linear or branched alkyl group. Specific examples are a methyl group, ethyl group, propyl group, or butyl group.

Examples of the acyl group with 1 to 4 carbon atoms denoted by $R^2$ are an acetyl group, propionyl group, oleyl group, or benzoyl group.

Examples of the aryl group with 6 to 10 carbon atoms denoted by $R^2$ are a phenyl group, xylyl group, or tolyl group.

The alkyl group with 1 to 6 carbon atoms denoted by $R^3$ is a linear or branched alkyl group. Specific examples are a methyl group, ethyl group, propyl group, butyl group, pentyl group, or hexyl group.

Examples of the aryl group with 6 to 10 carbon atoms denoted by $R^3$ are a phenyl group, xylyl group, or tolyl group.

Examples of the compound denoted by general formula (I) above are the compounds described in paragraph [0073] of Japanese Unexamined Patent Publication (KOKAI) No. 2007-077327, which is expressly incorporated herein by reference in its entirety. The organic silicon compound denoted by general formula (I) contains a curable group. Thus, by conducting a curing treatment following coating, it is possible to form a hardcoat film in the form of a cured film.

The metal oxide particles contained in the hardcoat layer set forth above contribute to adjusting the refractive index and enhancing the hardness of the hardcoat layer. Specific examples are particles of tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO), and antimony oxide ($Sb_2O_5$). Metal oxide particles of a single type may be employed, or two or more may be combined for use. From the perspective of achieving both scratch resistance and optical characteristics, the particle diameter of the metal oxide particles desirably falls within a range of 5 to 30 nm. For similar reasons, the content of metal oxide particles in the hardcoat layer can be suitably set taking into account the refractive index and hardness. It is normally 5 to 80 mass percent of the solid component of the hardcoat composition. From the perspective of dispersibility in the hardcoat layer, the metal oxide particles are desirably colloidal particles.

The organic hardcoat layer can be formed by mixing the above components and, as needed, optional components such as organic solvents and surfactants (leveling agents) to prepare a hardcoat composition; coating the hardcoat composition on an intermediate inorganic layer; and conducting a curing treatment (heat curing, photocuring, or the like) based on the curable group. The dipping method, spin-coating method, spraying method, or some other commonly employed method can be applied as the means of coating the hardcoat composition. From the perspective of surface precision, the dipping method and spin-coating method are desirable.

In addition to the various layers set forth above, a functional film such as a known antireflective film can be present at any position on the photochromic lens of the present invention.

EXAMPLES

The present invention will be further described based on Examples. However, the present invention is not limited to the embodiments shown in Examples.

Example 1

(1) Formation of a Primer Layer

A meniscus-shaped polythiourethane lens substrate (made by HOYA, product name EYAS, center thickness 2.0 mm, diameter 75 mm, surface curvature of convex surface (average value) about +0.8) was employed as the plastic lens substrate. On the convex surface of the lens substrate was coated by the spin-coating method a primer liquid in the form of an aqueous dispersion of polyurethane in which acrylic groups had been introduced into the polyurethane skeleton (polycarbonate polyol polyurethane emulsion, viscosity 100 mPa·s, solid component concentration 38 mass percent). Subsequently, the coating was dried for 15 minutes at a temperature of 25° C. in a 50% RH atmosphere to form a primer layer about 7 μm in thickness.

(2) Preparing a Photochromic Coating Liquid

A radical-polymerizable composition comprised of 20 mass parts of trimethylolpropane trimethacrylate, 35 mass parts of BPE oligomer (2,2-bis(4-methacryloyloxypolyethoxyphenyl)propane), 10 mass parts of EB6A (polyester oligomer hexacrylate), 10 mass parts of polyethylene glycol diacrylate with an average molecular weight of 532, and 10 mass parts of glycidyl methacrylate was prepared in a plastic vessel. To 100 mass parts of this radical-polymerizable composition were added 3 mass parts of photochromic dye in the form of the chromene 1 below, 5 mass parts of hindered amine oxidation-inhibiting agent (Chimassorb2020 from BASF), and 0.6 mass part of UV polymerization initiator in the form of CGI-1870 (made by BASF). The mixture was thoroughly stirred to obtain a composition. To this composition were added dropwise 6 mass parts of γ-methacryloyloxypropyltrimethoxysilane (KBM503 made by Shin-Etsu Chemical Co., Ltd.) with stirring. Subsequently, defoaming was conducted for two minutes in a rotating-revolving type agitation defoaming apparatus to obtain a curable composition with photochromic properties.

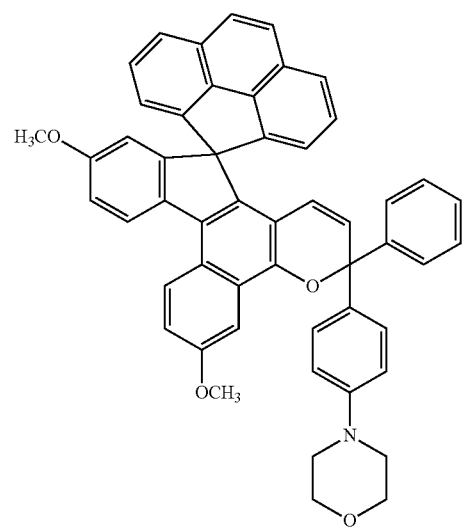 [SMILES: COc1ccc2c(c1)C1(c3c4c(c5cc(OC)ccc5c3-2)OC(c2ccccc2)(c2ccc(N3CCOCC3)cc2)C=C4)c2cccc3ccc4cccc1c4c23]

Chromene 1

(3) Forming a Photochromic Layer

The curable composition prepared in (2) above was spin-coated on the primer layer formed in (1) above. Subsequently, the lens was irradiated with ultraviolet radiation with a wavelength of 405 nm at a cumulative light quantity of 1,800 mJ/cm$^2$ (100 mW/cm$^2$, 3 minutes) with a UV lamp (D bulb) in a nitrogen atmosphere (oxygen concentration of equal to or less than 500 ppm). A curing treatment was then conducted for 60 minutes at 100° C. to form a photochromic layer 40 μm in thickness.

(4) Preparing a Hardcoat Composition

To a glass vessel equipped with magnetic stirrer were added 17 mass parts of γ-glycidoxypropyltrimethoxysilane, 30 mass parts of methanol, and 28 mass parts of colloidal silica dispersed in water (solid component 40 mass percent, average particle diameter 15 nm), the mixture was thoroughly mixed, and stirring was conducted for 24 hours at 5° C. Next, 15 mass parts of propylene glycol monomethyl ether, 0.05 mass part of silicone surfactant, and 1.5 mass parts of curing agent in the form of aluminum acetyl acetonate were added. The mixture was thoroughly stirred and then filtered to prepare a hardcoating liquid (hardcoat composition).

(5) Forming a Hardcoat Layer

The hardcoat composition prepared in (4) above was coated by dipping (withdrawal rate 20 cm/minute) on the photochromic layer formed in (3) above and curing was conducted by heating for 60 minutes at 100° C. to form a hardcoat layer 3 μm in thickness.

By means of the above steps a photochromic lens was obtained comprising a primer layer, a photochromic layer, and an organic hardcoat layer, in this order on a lens substrate.

Examples 2 to 4

With the exception that the hindered amine oxidation-inhibiting agents below were employed, photochromic lenses were obtained in the same manner as in Example 1.

Hindered Amine Oxidation-Inhibiting Agents Employed in Examples and Comparative Examples Example 1

Product Name: Chimassorb 2020 FDL (Made by BASF)

Example 2

Product Name: Tinuvin 622 LD (Made by BASF)

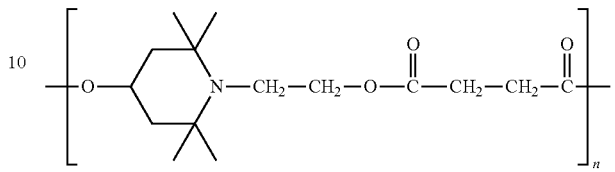

Example 3

Product Name: Tinuvin783FDL (Made by BASF)

Mixture of

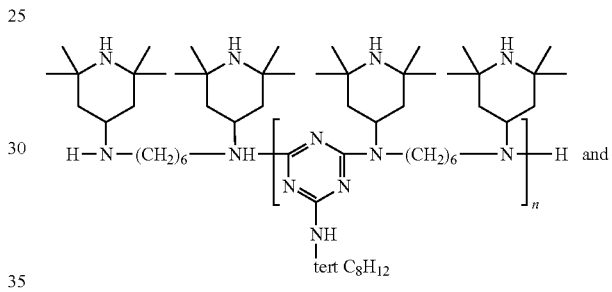

and

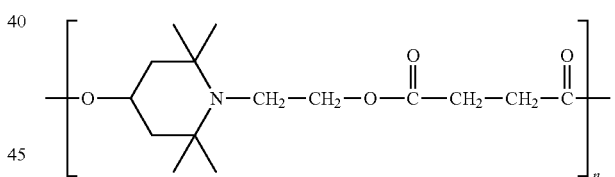

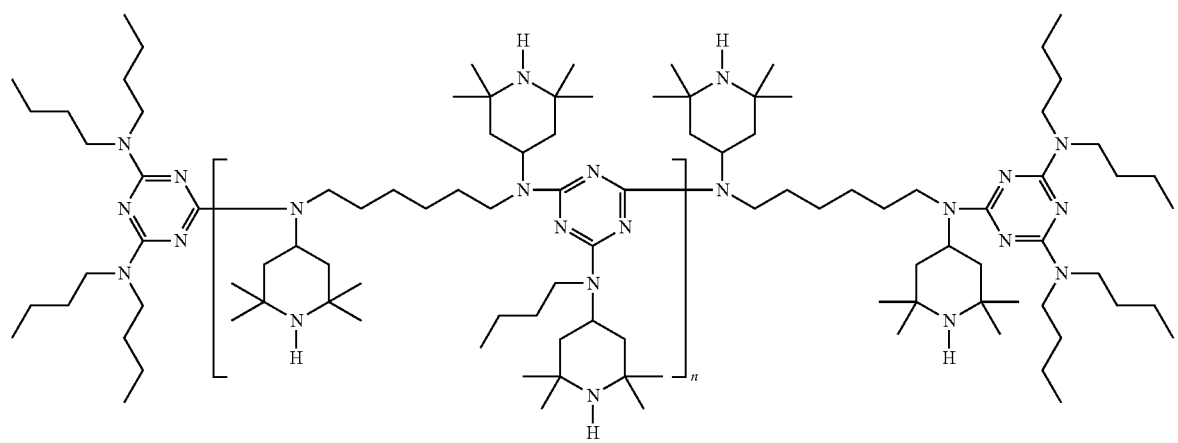

Example 4

Product Name: Tinuvin111FDL (Made by BASF)

Mixture of

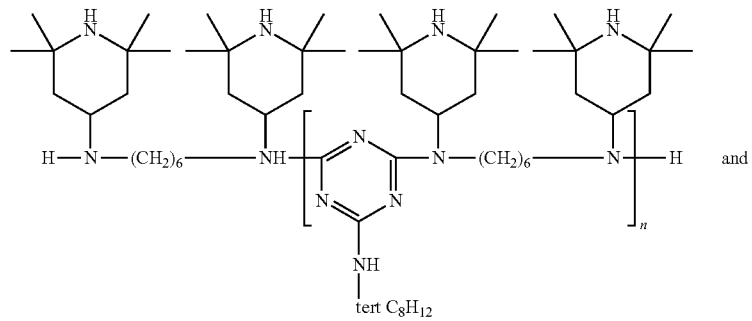

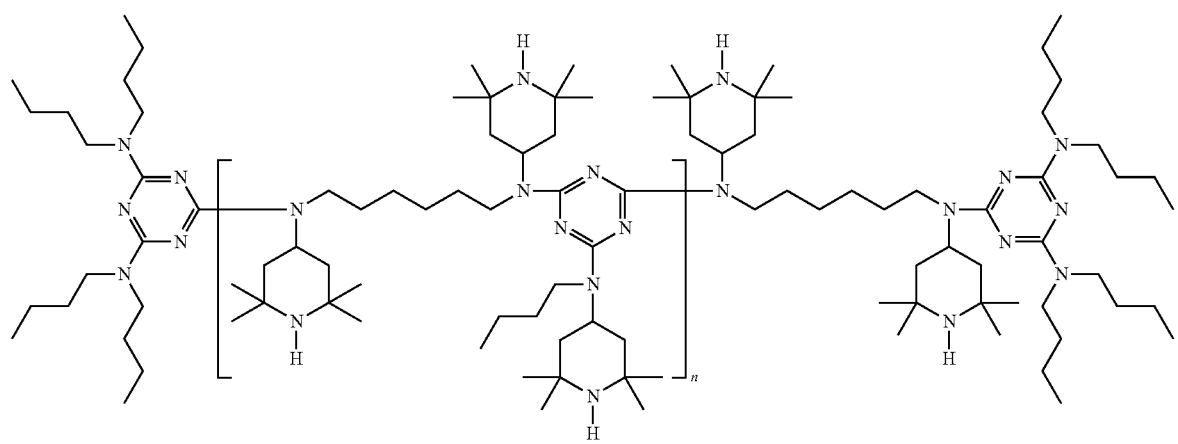

Comparative Example 1

With the exception that no hindered amine oxidation-inhibiting agent was added to the photochromic liquid, a photochromic lens was obtained by the same method as in Example 1.

Comparative Example 2

With the exception that Sanol LS-765 (bis(1,2,2,6,6-pentamethyl-4-piperidyl)sebacate, methyl(1,2,2,6,6-pentamethyl-4-piperidyl)sebacate) made by Sankyo Lifetech Co., Ltd. was used instead of the hindered amine oxidation-inhibiting agent, a photochromic lens was obtained by the same method as in Example 1.

Evaluation of Clouding

The haze value of the photochromic lenses that had been prepared was measured with a Hazemeter MH-150 made by Murakami Color Research Laboratory. Since no clouding is observed visually at a haze value of equal to or lower than 0.3 percent, this can be used to determine that an eyeglass lens possesses the adequate optical characteristics. Accordingly, lenses with a haze value of equal to or lower than 0.3 percent were evaluated as "O" and lenses exceeding 0.3 percent as X. The results are given in Table 1.

TABLE 1

| | Molecular weight of piperidine ring-containing compound (Molecular weight distribution for Ex. 1 to 4, and average molecular weight for Comp. Ex. 2) | Evaluation result of clouding |
|---|---|---|
| Ex. 1 | 2600 to 3400 | o |
| Ex. 2 | 3100 to 4000 | o |
| Ex. 3 | 2000 to 4000 | o |
| Ex. 4 | 2000 to 3400 | o |
| Comp. Ex. 1 | Not contained | o |
| Comp. Ex. 2 | 467 | x |

Evaluation Results

As shown in Table 1, the haze value of the photochromic lens of Comparative Example 2 exceeded 0.3. Clouding was visually confirmed. Observation of the outer surface of the hardcoat layer of this lens revealed minute irregularities caused by precipitates.

By contrast, the occurrence of clouding was inhibited in Examples 1 to 4, in which a piperidine ring-containing compound with a molecular weight of equal to or greater than 1,000 was employed.

To accelerate seepage from the photochromic lens prepared in Comparative Example 2, the lens was placed for five hours in a heating furnace at an internal furnace temperature of 82° C. The surface of the hardcoat layer of the lens that was removed from the furnace was wiped with a solvent to recover the material that had seeped out onto the surface. When the seepage material that had been recovered was subjected to IR analysis, the same IR spectrum was obtained as for the piperidine ring-containing compound that had been employed in Comparative Example 2. The photochromic lens that had been prepared in Example 1 was subjected to the same seepage acceleration test, but no absorption peak derived from a piperidine ring was found.

Based on the above results, the cause of the clouding of the photochromic lens in Comparative Embodiment 2 was indicated to be the piperidine ring-containing compound of low molecular weight that had seeped out of the photochromic layer. No clouding occurred in Comparative Example 1 as is indicated in Table 1, but that was because no piperidine ring-containing compound was employed.

The present invention can provide a high-quality photochromic lens free of clouding while using a piperidine ring-containing compound that is useful as an oxidation-inhibiting agent and photostabilizing agent as a photochromic layer component. The use of a piperidine ring-containing compound can provide a photochromic lens affording good durability without deterioration with long-term use.

The photochromic lens of the present invention is suitable as an eyeglass lens of which good optical characteristics are required.

The invention claimed is:
1. A photochromic lens, which comprises:
   a photochromic layer comprising a photochromic dye and a resin component, and an organic hardcoat layer in this order, wherein
   the resin component is an acrylic resin, and
   the photochromic layer further comprises a piperidine ring-containing compound having a molecular weight of equal to or greater than 1,000.
2. The photochromic lens according to claim 1, wherein the piperidine ring-containing compound is a hindered amine.
3. The photochromic lens according to claim 2, wherein the molecular weight of the piperidine ring-containing compound is equal to or lower than 4,000.
4. The photochromic lens according to claim 3, wherein the organic hardcoat layer comprises an organic silicon compound and metal oxide particles.
5. The photochromic lens according to claim 2, wherein the organic hardcoat layer comprises an organic silicon compound and metal oxide particles.
6. The photochromic lens according to claim 1, wherein the molecular weight of the piperidine ring-containing compound is equal to or lower than 4,000.
7. The photochromic lens according to claim 6, wherein the organic hardcoat layer comprises an organic silicon compound and metal oxide particles.
8. The photochromic lens according to claim 1, wherein the organic hardcoat layer comprises an organic silicon compound and metal oxide particles.

* * * * *